(12) United States Patent
Bester et al.

(10) Patent No.: US 10,783,125 B2
(45) Date of Patent: Sep. 22, 2020

(54) AUTOMATIC DATA PURGING IN A DATABASE MANAGEMENT SYSTEM

(71) Applicant: INTERNATIONAL BUSINESS MACHINES CORPORATION, Armonk, NY (US)

(72) Inventors: Karla Bester, Ridgewood (AU); Mark A. Shewell, Perth (AU); Stephen J. Yates, Beaconsfield (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/346,121

(22) Filed: Nov. 8, 2016

(65) Prior Publication Data

US 2018/0129687 A1 May 10, 2018

(51) Int. Cl.
*G06F 16/215* (2019.01)
*G06F 16/22* (2019.01)
*G06F 16/23* (2019.01)

(52) U.S. Cl.
CPC ........ *G06F 16/215* (2019.01); *G06F 16/2282* (2019.01); *G06F 16/2379* (2019.01)

(58) Field of Classification Search
CPC ......... G06F 17/30303; G06F 17/30339; G06F 17/30377; G06F 16/215; G06F 16/2379; G06F 16/2282
See application file for complete search history.

(56) References Cited

U.S. PATENT DOCUMENTS

| | | | |
|---|---|---|---|
| 9,037,546 B2 | 5/2015 | Wong et al. | |
| 9,218,371 B2 | 12/2015 | Jaiswal et al. | |
| 9,361,304 B2 | 6/2016 | Hobart et al. | |
| 2001/0044795 A1* | 11/2001 | Cohen | G06F 17/30699 |
| 2002/0065974 A1* | 5/2002 | Thompson | G06F 17/30595 711/1 |
| 2003/0037034 A1* | 2/2003 | Daniels | G06Q 10/087 |
| 2005/0055357 A1* | 3/2005 | Campbell | G06F 8/61 |
| 2007/0294308 A1* | 12/2007 | Megerian | G06F 16/21 |

(Continued)

FOREIGN PATENT DOCUMENTS

| | | |
|---|---|---|
| CN | 101556589 A | 10/2009 |
| CN | 103793530 A | 5/2014 |

OTHER PUBLICATIONS

"Relational Databases 101: Looking at the Whole Picture," by Scott W. Ambler, Copyright 2002-2003. (Reproduced from https://web.archive.org/web/20030223122651/http://www.agiledata.org/essays/relationalDatabases.html). (Year: 2003).*

*Primary Examiner* — Jay A Morrison
(74) *Attorney, Agent, or Firm* — Cantor Colburn LLP; William Kinnaman (57) ABSTRACT

A computer-implemented method for managing a database space includes writing, via a processor, a purge rule to a database management system (DBMS). When the purge rule is executed by the DBMS they automatically purge data in one or more databases at regular intervals. The method includes executing, via a DBMS processor, the purge rule. The purge rule is configured to define, via the DBMS processor, a purge object having purge object attributes without user intervention, and purge, via the DBMS processor, the data based on the purge rule at intervals defined by the purge rule attributes and without user intervention.

11 Claims, 6 Drawing Sheets

(56) References Cited

U.S. PATENT DOCUMENTS

| | | | | |
|---|---|---|---|---|
| 2008/0120346 A1* | 5/2008 | Neogi | ............... | G06F 17/30312 |
| 2014/0279542 A1* | 9/2014 | Baird | ................... | G06Q 20/322 |
| | | | | 705/44 |
| 2014/0351201 A1* | 11/2014 | Hobart | .............. | G06F 17/30085 |
| | | | | 707/603 |
| 2016/0232159 A1* | 8/2016 | Parikh | ............... | G06F 17/30539 |
| 2017/0004152 A1* | 1/2017 | Kommisetty | ......... | G06F 16/113 |

* cited by examiner

```
CREATE PURGE FROM TRANSACTIONS WHERE TRAN_DATE < CURRENT DATE - 10 DAYS
    SET PURGE_START_DATE = '2016-04-14',
        PURGE_TIME       = '01:00:00',
        PURGE_INTERVAL   = WEEKLY;
```
⎫
⎬ 402
⎭

FIG. 4

```
Table TRANSACTIONS before 2016-04-14 01:00:00
+------------+-------------+-------+------------+
| Tran_Date  | Transaction | Count | Department |
+------------+-------------+-------+------------+
| 2016-04-03 | TR003A      | 23    | CIO        |
| 2016-04-03 | BU883D      | 2     | BUY     ⎫
| 2016-04-04 | AB973H      | 22    | CIO     ⎬ 502
| 2016-04-05 | TR003A      | 9     | CIO     ⎭
| 2016-04-06 | BU883D      | 18    | BUY        |
| 2016-04-07 | AB973H      | 1     | CIO        |
+------------+-------------+-------+------------+

Table TRANSACTIONS after 2016-04-14 01:00:00
+------------+-------------+-------+------------+
| Tran_Date  | Transaction | Count | Department |
+------------+-------------+-------+------------+
| 2016-04-04 | AB973H      | 22    | CIO        |
| 2016-04-05 | TR003A      | 9     | CIO        |
| 2016-04-06 | BU883D      | 18    | BUY        |
| 2016-04-07 | AB973H      | 1     | CIO        |
+------------+-------------+-------+------------+
```

AUTOMATIC DATA PURGING IN A DATABASE MANAGEMENT SYSTEM

BACKGROUND

The present disclosure relates to database space management, and more specifically, to the automatic purging of data in a database management system.

In a typical relational database management system (DBMS), data is stored within columns of a table as per the following sample. A DBMS usually contains multiple databases, with each database containing one or more tables and each table containing one or more columns. This sample shows a single table with many rows, and how the columns, tables, and databases relate to each other within a DBMS. In this sample, each row has a transaction date column, a transaction code column, a column which contains the count of the number of times this transaction executed during the specific day, and a department code.

Applications use data manipulation instructions, such as the Structured Query Language (SQL), to insert, extract or manipulate data within the tables. As more and more rows are inserted into the database tables, the tables could eventually contain vast volumes of data. In order to manage database space, as well as to optimize database performance, old rows must be discarded (purged) regularly. There are various existing ways to purge old data.

SUMMARY

According to an embodiment of the present invention, a computer-implemented method for managing a database is described. The method may include writing, via a processor, a purge rule to a database management system (DBMS) that, when executed by the DBMS, automatically purge data at regular intervals. The method includes executing, via a DBMS processor, the purge rule. The purge rule is configured to define, via the DBMS processor, a purge object having purge object attributes without user intervention, and purge, via the DBMS processor, the data based on the purge rule and its attributes at intervals defined by the purge rule and without user intervention.

According to other embodiments, a system for managing a database is described. The system may include a processor configured to write a purge rule to a database management system (DBMS) that, when executed by the DBMS, automatically purge data at regular intervals. The processor is further configured to execute the purge rule, where the purge rule is configured to define a purge object having purge object attributes without user intervention, and purge the data based on the purge rule at intervals defined by the purge rule and without user intervention.

According to yet other embodiments, a non-transitory computer-readable storage medium is described. The non-transitory storage medium may include program instructions that are executable by a processor to perform a method for managing a database. The method may include writing, via a processor, a purge rule to a database management system (DBMS). The method includes executing, via a DBMS processor, the purge rule. The purge rule is configured to define, via the DBMS processor, a purge object having purge object attributes without user intervention, and purge, via the DBMS processor, the data based on the purge rule and its attributes at intervals defined by the purge rule and without user intervention.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
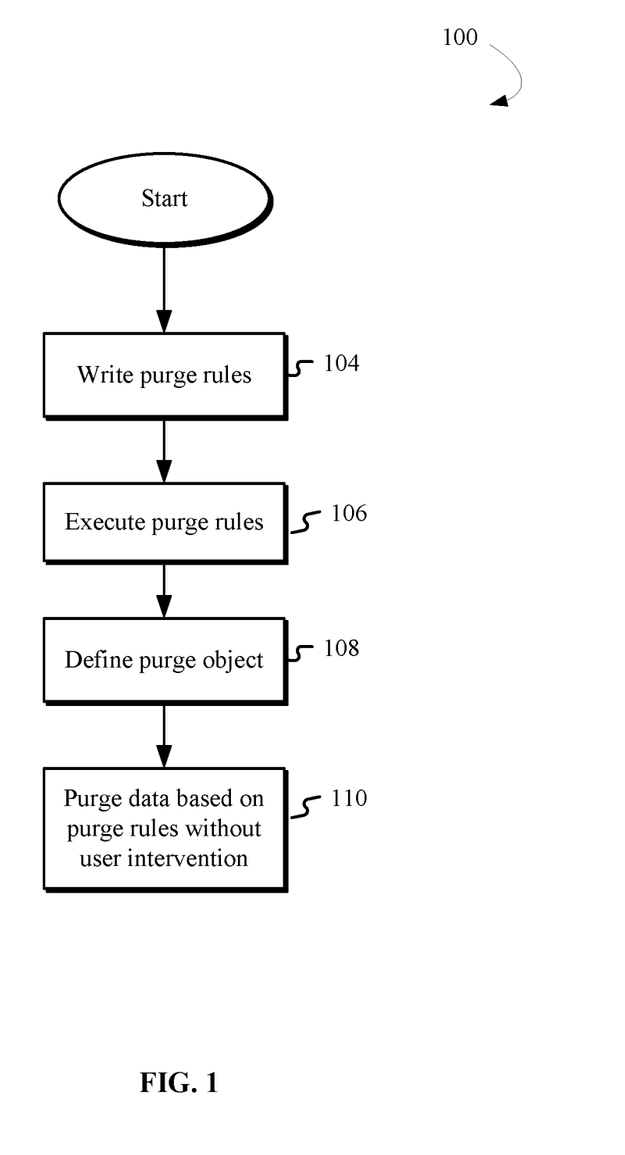
FIG. 1 depicts a flow diagram of a method for managing a database according to one embodiment.

There are various conventional ways to purge old data in a database. Conventional methods for data purging in databases require manual effort and/or user intervention. Some conventional approaches include deleting the target rows from the tables by manually executing SQL DELETE statements, or LOAD/UNLOAD statements. Other existing methods may schedule user-created scripts to run routinely to delete old data. In other methods, users may schedule vendor-supplied utilities to run routinely, for example, the DB2 REORG/DISCARD utility. It may be advantageous to provide an ongoing and automated database purging system that is managed by the DBMS, to simplify the purging of old data on an ongoing basis without user intervention. FIG. 1 depicts a flow diagram of a computer-implemented method 100 for managing a database, according to one embodiment.

Referring now to FIG. 1, in some aspects, after an initial start step as shown in block 104, a system processor (e.g., processor 601 shown with respect to FIG. 6) can be configured to write one or more purge rules to a database management system (DBMS) that, when executed by the DBMS, automatically purge data in one or more databases at regular intervals. In some aspects, the DBMS may be a database management engine 614 (shown in FIG. 6). An exemplary database management system 200 is described in greater detail with respect to FIG. 2.

Figure 2:
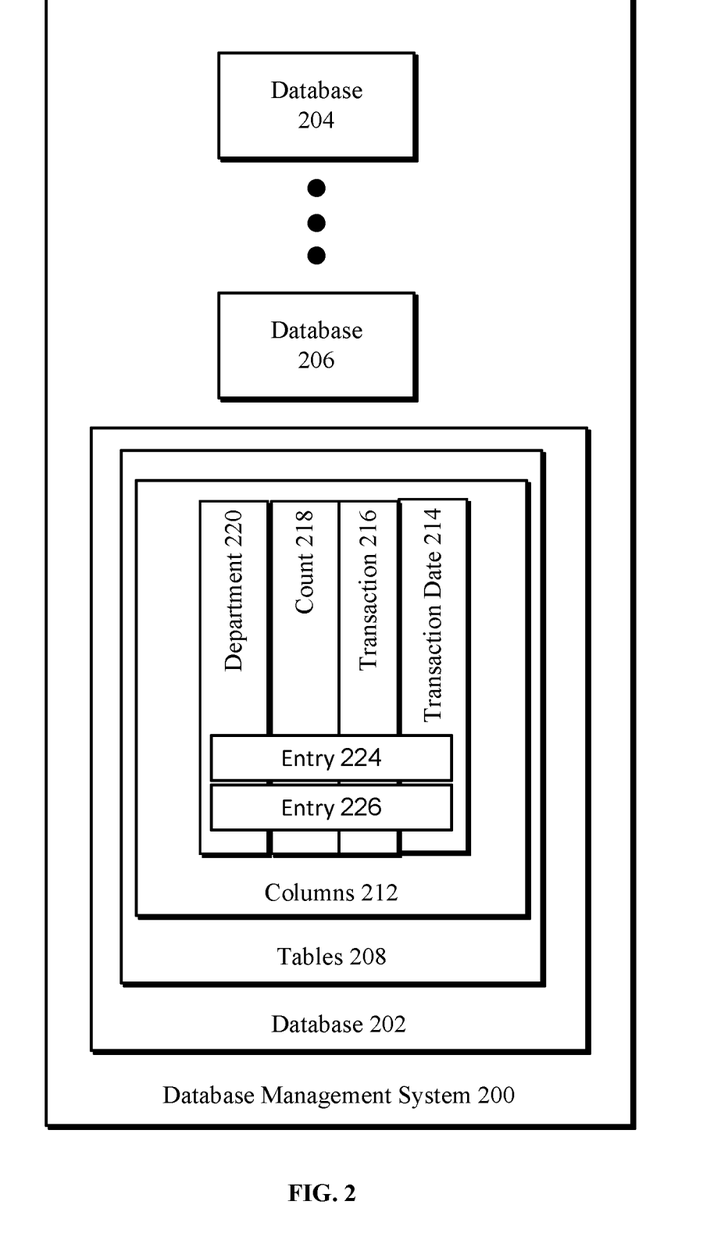
FIG. 2 depicts a block diagram of a database management system according to one embodiment.

Referring briefly to FIG. 2, database management system 200 can include and manage a plurality of databases, such as, for example, database 202, database 204, database, 206, etc. Although three databases are depicted, any number of databases may be managed by database management system 200. As an exemplary database 202, the database can include a plurality of tables (one such table is shown table 208).

A table may include a plurality of columns (one example of a column is depicted as column 212). Columns 212 describe a plurality of data columns including, for example, transaction date 214, transaction 216, count 218, department 220, etc. Although only four columns of data are depicted in columns 212, it should be appreciated that a table may contain any number of columns of data. Rows of data populate across the columns 214-220, such as for example, entry 224, entry 226, etc. Any number of entries (rows of data) may be included in columns 212. Databases typically include many thousands or millions of rows of data.

Figure 3:
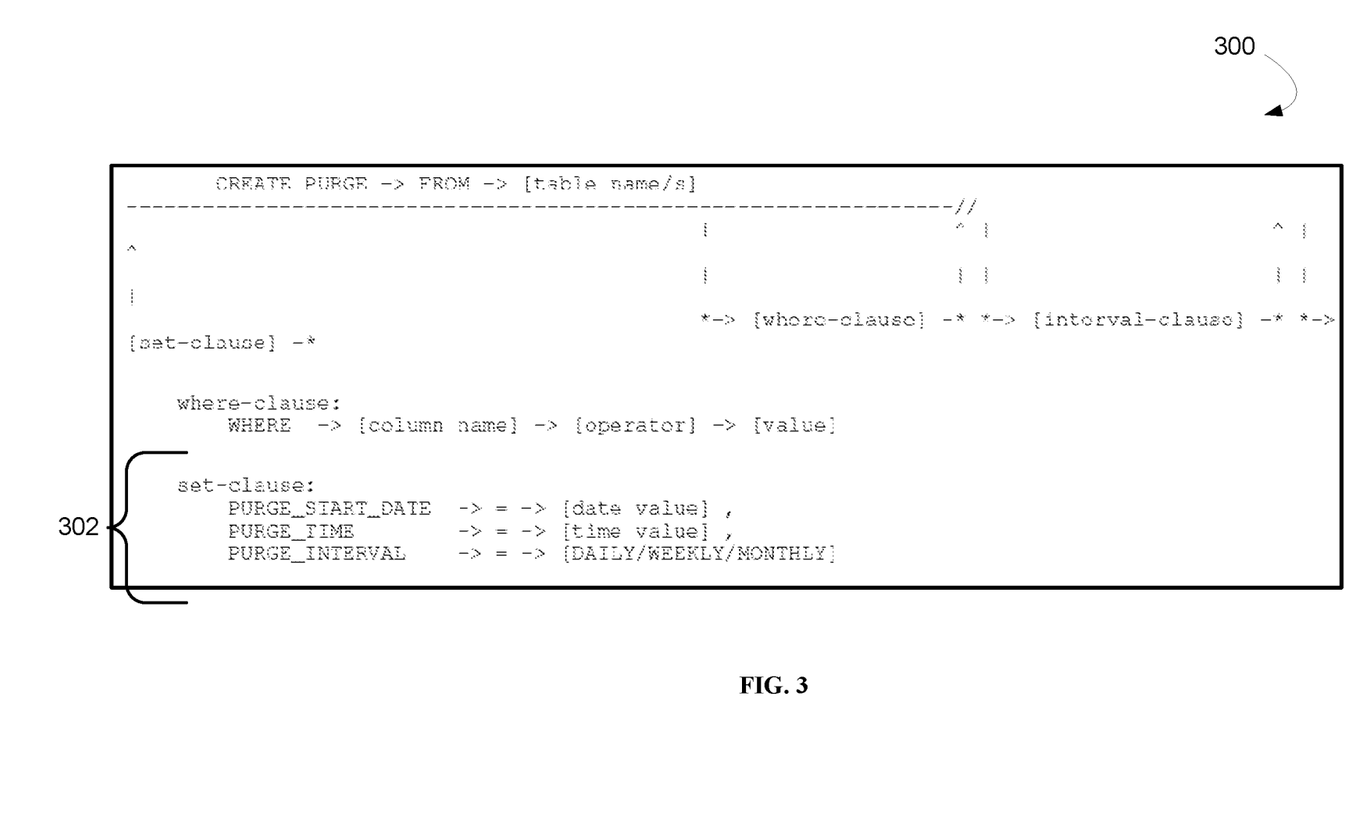
FIG. 3 depicts a diagram of an exemplary purge rule according to one embodiment.
Figure 5:
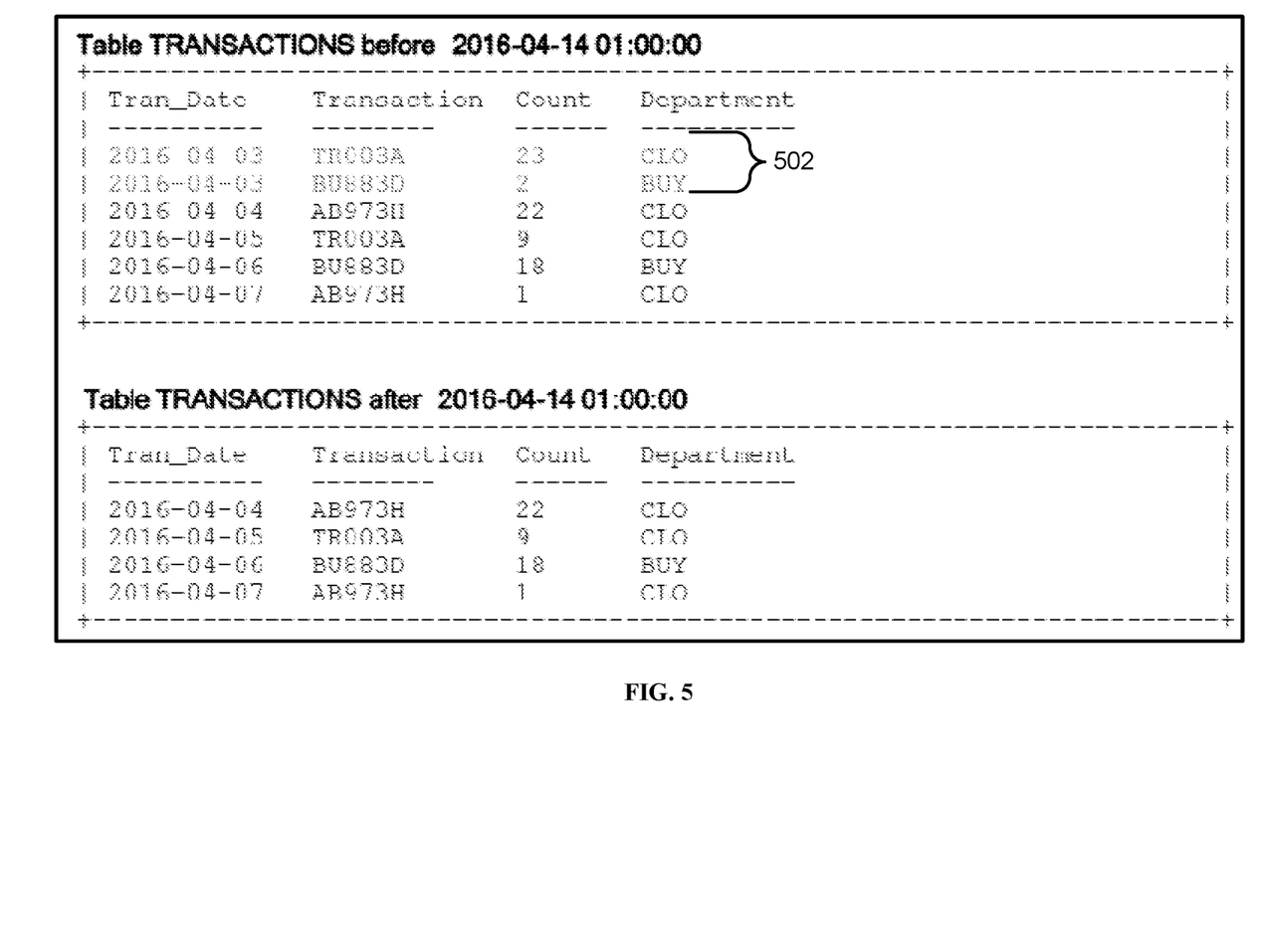
FIG. 5 depicts a diagram of a table of transactions flagged for purging according to one embodiment.

When rows of data become old or obsolete, it is advantageous to purge the unneeded or old data. In some aspects, purge rules may create a framework for automatically identifying which rows should be deleted. According to some embodiments, purge rules may cause processor 601 to delete one or more rows, such as, for example, entries 224 and 226. FIG. 5 depicts a table having rows identified to be purged by executing a purge rule. As an example, processor 601 may delete all rows that are older than 10 days, which can be identified by processor 601 by a purge rule. FIG. 3 depicts a purge rule 300, according to one embodiment.

Referring again to FIG. 3, purge rule 300 identifies particular databases, tables, columns, etc. containing the data for purging. In some aspects, purge rule 300 may include instructions to purge data according to location, data type, the age of data, a date, an operator identification, a period of time (interval), etc. With purge rule 300, processor 601 can manage database space in databases 202-206, etc., by automatically and routinely purging old rows (e.g., entries 224 and 226) once they meet the purge criteria set forth in the purge rule.

Purge rule 300 can include a plurality of purge objects indicative of purge object attributes. A purge object is created by processor 601 using DBMS language statements. Purge object attributes identify a particular portion of data that qualifies for purging based on that purge object. For example, a purge object attribute results in at least one row from at least one table set to be purged if the at least one row meets the criteria set out in the purge object attributes 302. As another example, entries 224 and 226 (FIG. 2) can be identified by purge object attributes if they are identified by processor 601 by executing purge rule 300 (and more particularly, purge object attributes 302).

Figure 4:
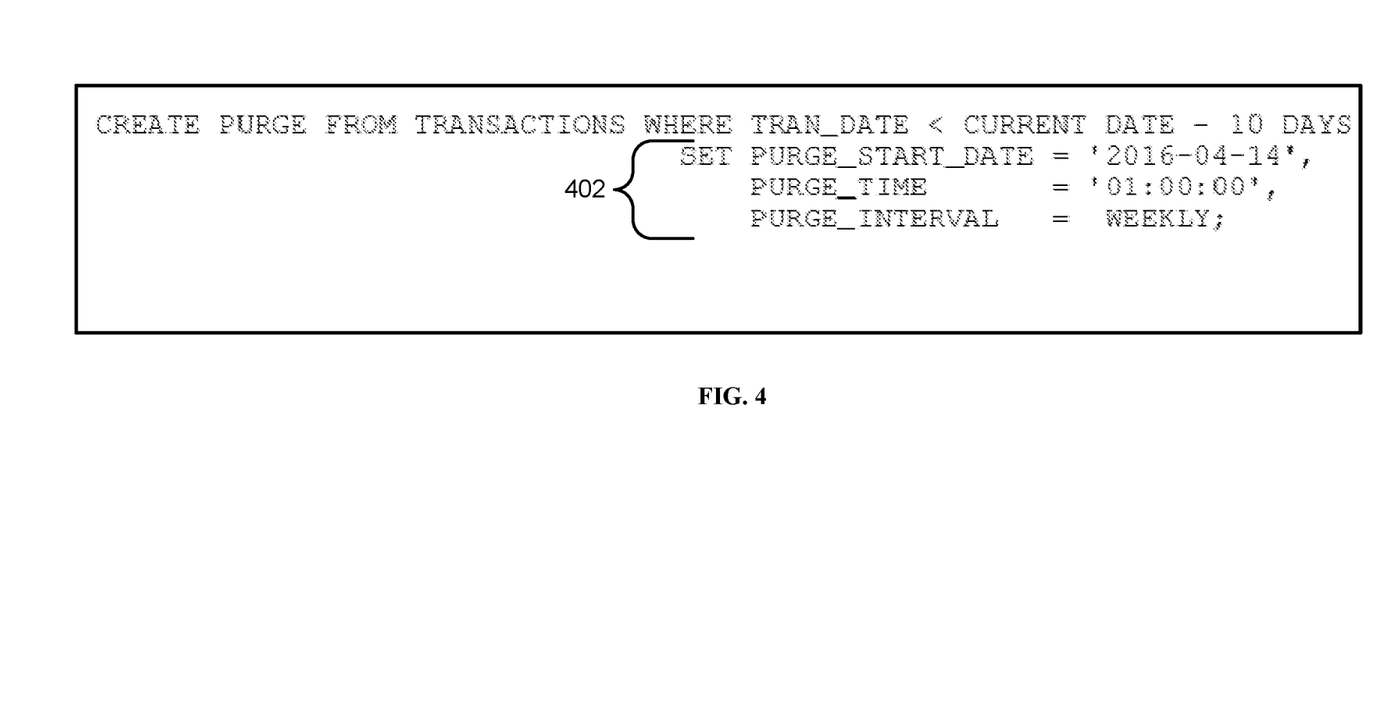
FIG. 4 depicts a diagram of an exemplary SQL statement for defining a purge object according to one embodiment.

Purge object attributes 302 are set or altered using one or more DBMS language statements, such as those shown in the SQL statement of FIG. 4. Referring briefly to FIG. 4, processor 601 may create a purge rule from transactions occurring between particular time intervals, which are designated by DBMS language statements 402. Accordingly, purge attributes such as old rows of data can be purged by processor 601 if those rows are identified via the purge rule by meeting particular criteria spelled out in the purge rule and its attributes.

In other aspects, purge rule 300 may cause processor 601 to delete one or more purge objects to deactivate automatic data purging. For example, purge rule 300 may set out a sub-rule configured to delete data after PURGE_INTERVAL meets a predetermined criteria. The predetermined criteria may be, for example, the passing of a particular time period, a completion of a time interval, etc. The intervals defined by the purge rule and its attributes can be indicative of when the purge object attributes 302 should be purged by the processor.

Referring again to FIG. 1, after writing the purge rule (shown in block 104) processor 601 can execute one or more purge rules, as shown in block 106. In some aspects, executing the purge rules can include defining, via the DBMS processor, a purge object having purge object attributes without user intervention, as shown in block 108. Processor 601 may create purge objects using DBMS language statements. For example, a purge object may be a date value, a time value, a time interval, etc. as shown in FIG. 3.

In other aspects, purge rule 300 may cause processor 601 to purge data based on purge rule 300, at intervals defined by purge rule 300, and without user intervention, as shown in block 110. Purge rule 300, which is exemplary only, depicts one possible rule for purging rows identified by particular purge rule attributes. Processor 601 may purge rows based on the purge rule automatically when those rows meet the criteria set out in the rule and its attributes.

Figure 6:
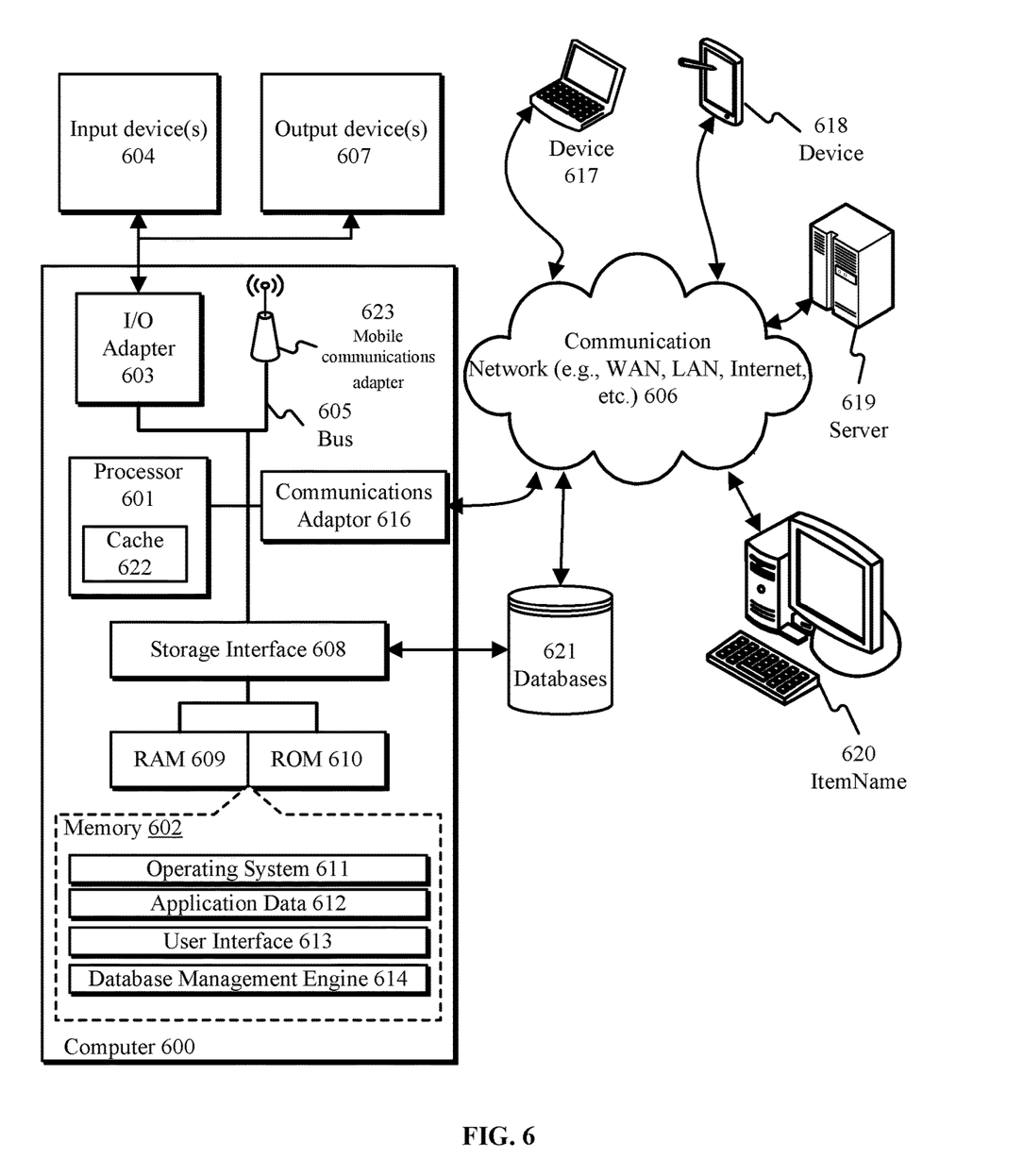
FIG. 6 depicts a block diagram of a computer system for use in practicing the teachings herein.

FIG. 6 illustrates a block diagram of an exemplary computing environment and computer system 600 (hereafter "computer 600") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 600 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 6, the computer 600 includes processor 601. Computer 600 also includes memory 602 coupled to processor 601, and one or more input/output adapters 603 that may be communicatively coupled via system bus 605. Memory 602 may be operatively coupled to one or more internal or external memory devices via a storage interface 608. Communications adapter 616 may be operatively connect computer 600 to one or more networks 606. System bus 605 may connect one or more user interfaces via input/output (I/O) adapter 603. I/O adapter 603 may connect a plurality of input devices 604 to computer 600. Input devices may include, for example, a keyboard, a mouse, a microphone, a sensor, etc. System bus 605 may also connect one or more output devices 607 via I/O adapter 603. Output device 607 may include, for example, a display, a speaker, a touchscreen, etc.

Processor 601 is a hardware device for executing hardware instructions or software, particularly that stored in a non-transitory computer-readable memory (e.g., memory 602). Processor 601 can be any custom made or commercially available processor, a central processing unit (CPU), a plurality of CPUs, for example, CPU 601a-601c, an auxiliary processor among several other processors associated with the computer 600, a semiconductor based microprocessor (in the form of a microchip or chip set), or generally any device for executing instructions. Processor 601 can include a cache memory 622, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 622 may be organized as a hierarchy of more cache levels (L1, L2, etc.).

Processor 601 may be disposed in communication with one or more memory devices (e.g., RAM 609, ROM 610, one or more external databases 621, etc.) via a storage interface 608. Storage interface 608 may also connect to one or more memory devices including, without limitation, one or more databases 621, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, database 202, database 204, database 206, databases 621, etc.

Memory 602 can include random access memory (RAM) 609 and read only memory (ROM) 610. RAM 609 can be any one or combination of volatile memory elements (e.g., DRAM, SRAM, SDRAM, etc.). ROM 610 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 602 may incorporate electronic, magnetic, optical, and/or other types of non-transitory computer-readable storage media. Memory 602 may also be a distributed architecture, where various components are situated remote from one another, but can be accessed by processor 601.

The instructions in memory 602 may include one or more separate programs, each of which comprises an ordered listing of computer-executable instructions for implementing logical functions. In the example of FIG. 6, the instructions in memory 602 may include an operating system 611. Operating system 611 can control the execution of other computer programs and provides scheduling, input-output control, file and data management, memory management, and communication control and related services.

The instructions in memory 602 may further include application data 612, and a user interface 613.

Memory 602 may also include a database management engine 614, configured to write one or more purge rules that, when executed by the DBMS, automatically purge data at regular intervals. Database management engine 614 may cause processor 601 to execute the purge rules, where the purge rules are configured to define a purge object having purge object attributes without user intervention, and purge the rows identified based on the purge rules and their attributes at intervals defined by the one or more purge rules and their attributes and without user intervention.

I/O adapter 603 can be, for example but not limited to, one or more buses or other wired or wireless connections. I/O adapter 603 may have additional elements (which are omitted for simplicity) such as controllers, microprocessors, buffers (caches), drivers, repeaters, and receivers, which may work in concert to enable communications. Further, I/O adapter 603 may facilitate address, control, and/or data connections to enable appropriate communications among the aforementioned components.

I/O adapter 603 can further include a display adapter coupled to one or more displays. I/O adapter 603 may be configured to operatively connect one or more input/output (I/O) devices 607 to computer 600. For example, I/O 603 may connect a keyboard and mouse, a touchscreen, a speaker, a haptic output device, or other output device. Output devices 607 may include but are not limited to a printer, a scanner, and/or the like. Other output devices may also be included, although not shown. Finally, the I/O devices connectable to I/O adapter 603 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 600 may include a mobile communications adapter 623. Mobile communications adapter 623 may include GPS, cellular, mobile, and/or other communications protocols for wireless communication.

In some embodiments, computer 600 can further include communications adapter 616 for coupling to a network 606.

Network 606 can be an IP-based network for communication between computer 600 and any external device. Network 606 transmits and receives data between computer 600 and devices and/or systems external to computer 600. In an exemplary embodiment, network 606 can be a managed IP network administered by a service provider. Network 606 may be a network internal to an aircraft, such as, for example, an avionics network, etc. Network 606 may be implemented in a wireless fashion, e.g., using wireless protocols and technologies, such as WiFi, WiMax, etc. Network 606 may also be a wired network, e.g., an Ethernet network, an ARINC 429 network, a controller area network (CAN), etc., having any wired connectivity including, e.g., an RS232 connection, R5422 connection, etc. Network 606 can also be a packet-switched network such as a local area network, wide area network, metropolitan area network, Internet network, or other similar type of network environment. The network 606 may be a fixed wireless network, a wireless local area network (LAN), a wireless wide area network (WAN) a personal area network (PAN), a virtual private network (VPN), intranet or other suitable network system.

Network 606 may operatively connect computer 600 to one or more devices including device 617, device 618, and device 620. Network 606 may also connect computer 600 to one or more servers such as, for example, server 619.

If computer 600 is a PC, workstation, laptop, tablet computer and/or the like, the instructions in the memory 602 may further include a basic input output system (BIOS) (omitted for simplicity). The BIOS is a set of essential routines that initialize and test hardware at startup, start operating system 611, and support the transfer of data among the operatively connected hardware devices. The BIOS is stored in ROM 610 so that the BIOS can be executed when computer 600 is activated. When computer 600 is in operation, processor 601 may be configured to execute instructions stored within the memory 602, to communicate data to and from the memory 602, and to generally control operations of the computer 600 pursuant to the instructions.

Embodiments of the present disclosure include the ability to define and maintain a PURGE object within the database, allowing the DBMS to manage the automatic purging of data based on the attributes of the PURGE object without user intervention. Embodiments for purging old rows from a database have advantages compared to existing methods. First, they provide an easier way to manage database space by automatically and routinely purging old rows once they meet the purge criteria. The management of database space is controlled by the DBMS and is not a manual process. Furthermore, the execution of manual DELETE or LOAD/UNLOAD statements is not required, because the database table rows will be deleted automatically by the DBMS, as governed by the attributes of the PURGE object. The automated features of embodiments also alleviate the need to routinely monitor utilities to delete data by database administrators and users. The automatic purging can be set at table creation time, further simplifying the managing of database space.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a database, comprising:
   writing, via a processor, a purge rule to a database management system (DBMS) that, when executed by the DBMS, automatically purges data in one or more databases at regular intervals, wherein the purge rule corresponds to a table in the one or more databases, and wherein the purge rule is set at a creation time of the table; and
   executing, via a DBMS processor, the purge rule, wherein executing the purge rule defines, without user intervention, a purge object having purge object attributes, the purge object created using DBMS language statements;
   altering, via the DMBS processor, the purge object attributes using DBMS language statements; and
   purging, via the DBMS processor, the data from the table based on the purge rule and its attributes at intervals defined by the purge rule and without user intervention.

2. The computer-implemented method of claim 1, wherein the purge object attributes are indicative of at least one row from the table.

3. The computer-implemented method of claim 1, wherein the purge rule causes the processor to delete one or more purge objects to deactivate automatic data purging.

4. The computer-implemented method of claim 1, wherein the intervals defined by the purge rule are indicative of when the data should be purged by the DBMS processor.

5. A system for managing a database, comprising:
   a processor configured to:
   write a purge rule to a database management system (DBMS) that, when executed by the DBMS, automatically purges data in one or more databases at regular intervals, wherein the purge rule corresponds to a table in the one or more databases, and wherein the purge rule is set at a creation time of the table;
   execute the purge rule, wherein executing the purge rule defines, without user intervention, a purge object having purge object attributes, the purge object created using DBMS language statements;
   alter the purge object attributes using DBMS language statements; and
   purge the data from the table based on the purge rule and its purge object attributes at intervals defined by the purge rule and without user intervention.

6. The system of claim 5, wherein the purge object attributes are indicative of at least one row from the table.

7. The system of claim 5, wherein the purge rule cause the processor to delete one or more purge objects to deactivate automatic data purging.

8. The system of claim 5, wherein the intervals defined by the purge rule are indicative of when the data should be purged by the processor.

9. A computer program product for managing a database, the computer program product comprising a computer readable storage device having program instructions embodied therewith, the program instructions executable by a processor to cause the processor to perform a method comprising:
   writing, via a processor, a purge rule to a database management system (DBMS) that, when executed by a DBMS processor, automatically purges data in one or more databases at regular intervals, wherein the purge rule corresponds to a table in the one or more databases, and wherein the purge rule is set at a creation time of the table;
   altering, via the processor, the purge object attributes using DBMS language statements; and
   executing, via a DBMS processor, the purge rule, wherein executing the purge rule defines, without user intervention, a purge object having purge object attributes, the purge object created using DBMS language statements; and
   purging, via the DBMS processor, the data from the table based on the purge rule and its purge object attributes at intervals defined by the purge rule and without user intervention.

10. The computer program product of claim 9, wherein the purge object attributes are indicative of at least one row from the table.

11. The computer program product of claim 9,
    wherein the purge rule causes the DBMS processor to delete one or more purge objects to deactivate automatic data purging; and
    wherein the intervals defined by the purge rule are indicative of when the purge object should be purged by the DBMS processor.

* * * * *